(12) United States Patent
Grant

(10) Patent No.: US 7,255,331 B2
(45) Date of Patent: Aug. 14, 2007

(54) CARBURETOR WITH ADJUSTABLE AIR BYPASS

(75) Inventor: Barry S. Grant, Dahlonega, GA (US)

(73) Assignee: Barry Grant, Inc., Dahlonega, GA (US)

( * ) Notice: Subject to any disclaimer, the term of this patent is extended or adjusted under 35 U.S.C. 154(b) by 235 days.

(21) Appl. No.: 10/966,770

(22) Filed: Oct. 15, 2004

(65) Prior Publication Data

US 2005/0082694 A1    Apr. 21, 2005

Related U.S. Application Data

(60) Provisional application No. 60/512,075, filed on Oct. 17, 2003.

(51) Int. Cl.
*F02M 19/10* (2006.01)

(52) U.S. Cl. .................. 261/23.2; 261/54; 261/63

(58) Field of Classification Search .............. 261/23.2, 261/63, 45, 54, DIG. 1, DIG. 12, DIG. 56
See application file for complete search history.

(56) References Cited

U.S. PATENT DOCUMENTS

| | | | | |
|---|---|---|---|---|
| 3,058,725 A | * | 10/1962 | Manning | 261/23.2 |
| 3,061,285 A | * | 10/1962 | Garski et al. | 261/23.2 |
| 3,294,375 A | * | 12/1966 | Szwargulski | 261/23.2 |
| 4,073,278 A | * | 2/1978 | Glenn | 123/198 F |
| 4,264,535 A | * | 4/1981 | Kikura | 261/23.2 |
| 4,351,300 A | * | 9/1982 | Selvidge et al. | 123/527 |
| 4,380,977 A | * | 4/1983 | Holstein | 123/198 F |
| 4,415,507 A | * | 11/1983 | Voliva | 261/18.3 |
| 5,809,972 A | * | 9/1998 | Grant | 123/478 |
| 2005/0110170 A1 | * | 5/2005 | Grant | 261/23.2 |

FOREIGN PATENT DOCUMENTS

JP        52-52045     *    4/1977    ............ 261/23.2

* cited by examiner

*Primary Examiner*—Richard L. Chiesa
(74) *Attorney, Agent, or Firm*—Thomas, Kayden, Horstemeyer & Risley, LLP

(57) ABSTRACT

A carburetor assembly includes a base plate (12) having an air bypass passage (30) extending there through, with air channels (71-74) formed in the surface of the base plate intersecting the air bypass passage and each of the butterfly bores (25-28) of the base plate. An adjustable air bypass valve (31) is mounted on the base plate and controls the movement of air through the bypass passage. A valve needle (50) is adjustably mounted to the valve body (48) for adjustably constricting the flow of fluid through the radially extending air inlet ports (60) and through the base plate air bypass passage, to allow for the adjustment of the volume of the air delivered to the engine at idle speed, independently of the movements of the butterfly valves.

10 Claims, 3 Drawing Sheets

CARBURETOR WITH ADJUSTABLE AIR BYPASS

CROSS REFERENCE

Applicant claims the benefit or Provisional Patent Application 60/512,075 filed in the U.S. Patent and Trademark Office on Oct. 17, 2003.

FIELD OF INVENTION

This invention concerns carburetors for high performance internal combustion engines for vehicles. More particularly, the invention concerns an adjustable air bypass for a carburetor assembly that allows some of the air to move through the carburetor body and its base plate and to reach the engine substantially without adding fuel to the air, and for adjusting the flow of the air independently of the function of the butterfly valves.

BACKGROUND OF THE INVENTION

It is well known that an internal combustion cylinder/piston engine requires the proper mixture of air (oxygen) and fuel (gasoline) for optimum performance. Also, the optimum mixture of fuel and air tends to vary as the speed of the engine changes. This is evident when the engine is operating a idle speed and then is rapidly accelerated.

With a high performance engine having a carburetor that controls the mixture of air and fuel to the engine, it is difficult to set the proper amount of air and fuel flow to the engine during idling of the engine. When an engine does not idle fast enough the minimum openings of the butterfly valves of the base plate can be adjusted slightly to remain open and increase the flow of air and fuel to the engine, but this only adjusts the flow of both fuel and air substantially at the same ratio, not adjustment of the air without adjusting the fuel, or vice versa.

It is important for an internal combustion engine to have the proper air and fuel mixture in order for the engine to idle and run properly. When an engine is at idle speed it is likely that a higher air-to-fuel ratio is required to avoid choking of the engine and hesitation ("stumbling") of the engine when the engine accelerated. If there is too much fuel in the air moving to the combustion chambers, the engine will idle rich. A rich condition produces problems ranging from an exhaust that is foul smelling and hard on the eyes to fouled sparkplugs that affect the performance of the engine. If there is not sufficient fuel present with respect to the air, the engine will idle lean. A lean condition will lead to a hesitation or "stumble" of engine performance when the throttles are opened in an attempt to accelerate the engine. Neither rich nor lean condition is advantageous to the engine.

Fuel is delivered to the engine at idle via the idle circuit of the carburetor. There are multiple adjustments that can be made to allow the carburetor to deliver a given amount of fuel. This fuel is what keeps the engine running until the butterflies open to a sufficient point, allowing the air speed to increase and start the main circuit that feeds the majority of the fuel to the running engine.

The amount of air delivered to the engine at idle generally is controlled by the position of the butterflies. The butterflies sit in the bores of the baseplate of a carburetor assembly. By rotating them from a near flat position (near horizontal) towards a more vertical position, the amount of air delivered to the engine through the carburetor is increased. It is with this butterfly adjustment that a common problem with adjusting carburetors at idle appears.

The carburetors idle circuit breaks down into two basic discharge locations per butterfly bore. Some of the fuel is discharged from the idle discharge hole, which is located below the butterfly, exposed to the depression of pressure caused by the running engine. It is this low pressure that leads to a difference in pressure with the atmosphere that causes air to move through the carburetor and draw fuel to be discharged into the engine. The second discharge location for idle fuel is the vertical transfer slot of the base plate. This vertical transfer slot is located in the path of movement of the upwardly opening butterfly valves, usually extending below the butterfly valves, and are exposed to the low pressure drawn by the engine. The transfer slots supply a small amount of the fuel necessary to keep the engine running at idle, but then act as a reserve fuel supply as the fuel demand of the engine increases in response to the increase of air flow, the increase of air flow responding to the movement of the butterflies to a more vertical position. In the proper closed butterfly position, about 10-15% of the transfer slots are exposed below the butterflies. The opening butterfly sweeps past this vertical slot, producing a low pressure area from the air passing between the edge of the butterfly and the bore of the baseplate which has the transfer slot cut into it. As the butterfly travels, more slot is exposed, thus delivering more and more fuel. The name "transfer slot" is used because this slot delivers the necessary fuel to the engine as the carburetor transfers from the idle circuit to the main circuit.

The problems mentioned above of poor idling and engine stumble usually occur if the butterfly is open too much during idle speed and as a result too much of the transfer slot is exposed to low pressure, drawing more fuel from the transfer slot and there is not enough fuel left in the reserve fuel supply to cover the transition from idle to main circuit operation. One of the greatest causes of this open butterfly condition results when an engine produces very little signal (vacuum) at idle. This condition can be caused by a radical camshaft (camshaft with long duration and/or high lift), large ported cylinder heads, or a large intake manifold. Due to the low vacuum produced by these engines at idle, it may be necessary to open the butterflies from the closed position a greater amount to allow enough air to enter the engine to maintain idle. This generally leads to a rich idle, and a stumble off idle due to the fact that the fuel reserve that feeds the transfer slot is out of fuel.

It is this bad tuning condition that this invention will improve.

SUMMARY OF THE INVENTION

The present invention provides an improved method of tuning a carburetor at idle engine speed that eliminates some of the long-standing poor tuning situations with certain engine combinations. The invention allows for the delivery of clean, filtered air to enter the engine without putting the butterflies in a less than optimal location, which can avoid a poor idle and a stumble just off idle. This is achieved in an embodiment of the invention through the use of a metering screw and body that is installed in the baseplate of the carburetor. Through this device air is transferred out of the venturis of the carburetor body above the butterfly valves in the base plate to a discharge location below the butterfly valves. Adjustment of the quantity of air delivered to the engine is independent of the angles of the butterfly valves, which allows for proper adjustment of the butterfly valves in relation to the fuel transfer slots.

DETAILED DESCRIPTION

Figure 1:
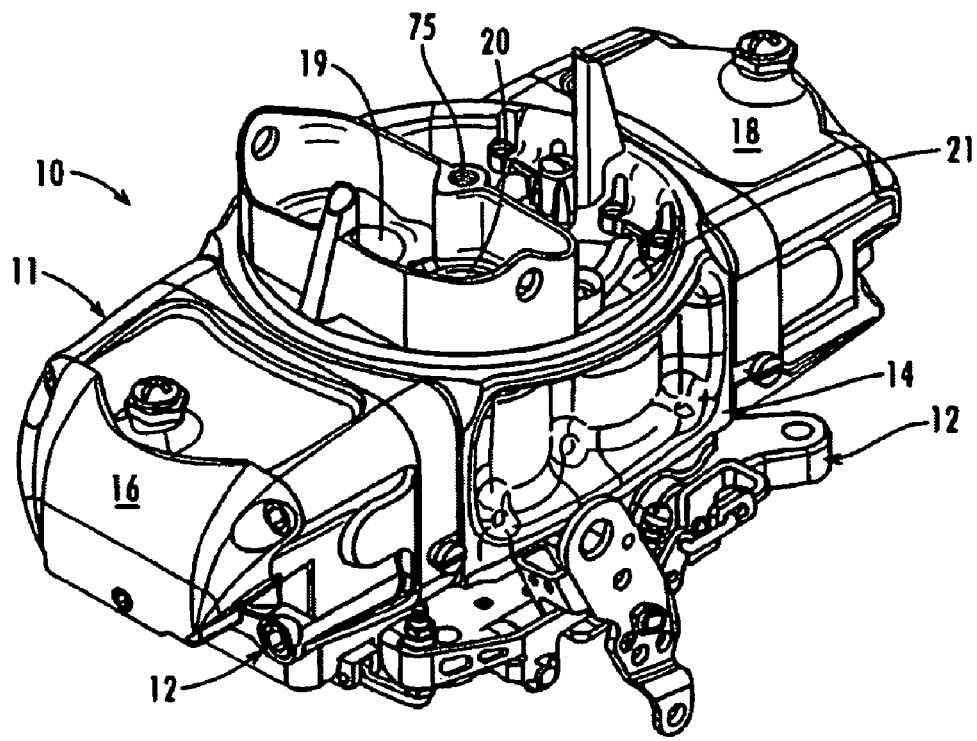
FIG. 1 is a perspective view of a carburetor body mounted on a base plate, showing a side, end and upper surface thereof.

Referring now in more detail to the drawings, in which like numerals indicate like parts throughout the several views, FIG. 1 illustrates a carburetor assembly 10 having a carburetor body 11 mounted on a base plate 12. The carburetor body includes the typical structural features, such as a center section 14 having four venturis arranged in a square array such as venturis 19, 20 and 21, and opposed fuel bowls 16 and 18 mounted on the sides of the center section.

Figure 2:
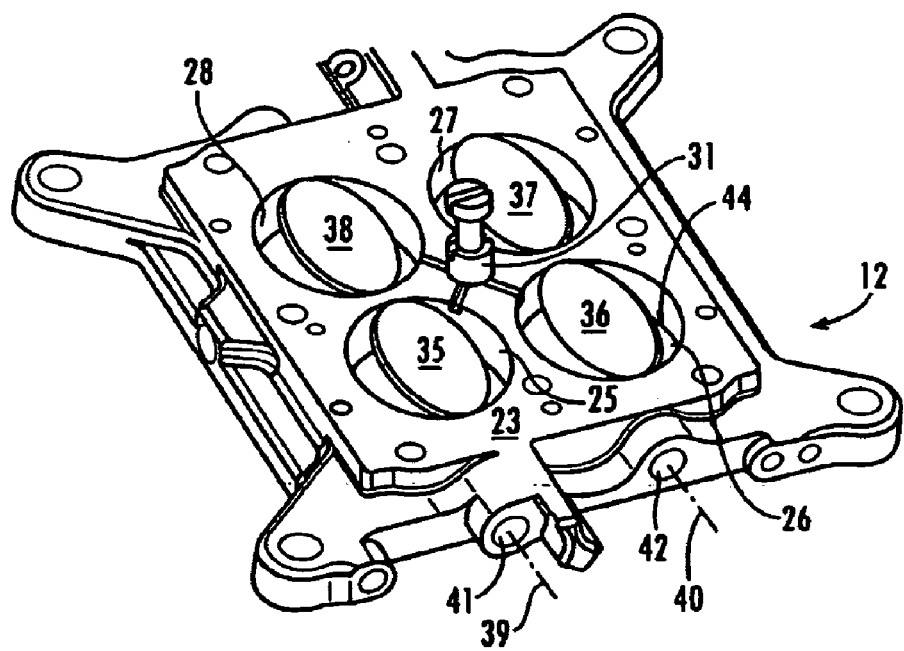
FIG. 2 is a perspective view of a base plate, showing the upper surface, a side and end surfaces thereof, with the adjustable air by pass valve installed in the base plate.

FIG. 2 illustrates the base plate 12 in more detail. The base plate is generally of square configuration and includes an upper surface 23 and an opposing lower surface (not shown), with butterfly bores 25, 26, 27 and 28 extending therethrough. The butterfly bores are arranged in a square array in the base plate, and an air bypass passage 30 is positioned centrally among the butterfly bores. An adjustable air bypass valve 31 is mounted in the air bypass passage 30.

Butterfly valves 35, 36, 37 and 38 are tiltably positioned in the butterfly bores 25, 26, 27 and 28, respectively, of the base plate 12. The butterfly valves tilt about axes 39 and 40 which extend through the horizontal bores 41 and 42 that accommodate the butterfly valve control rods (not shown). A vertically oriented fuel transfer slot 44 is formed in the cylindrical side wall of each butterfly bore 25-28 as shown in the side wall of butterfly bore 26, and the transfer slots intersect the lower surface (not shown) of the base plate. The locations of the transfer slots are in the upward sweep of the edge of the butterfly valves 35-38 so as to progressively adjust the degree of exposure of the transfer slots during the movement of the butterfly valves. This is conventional in the art.

Figure 3:
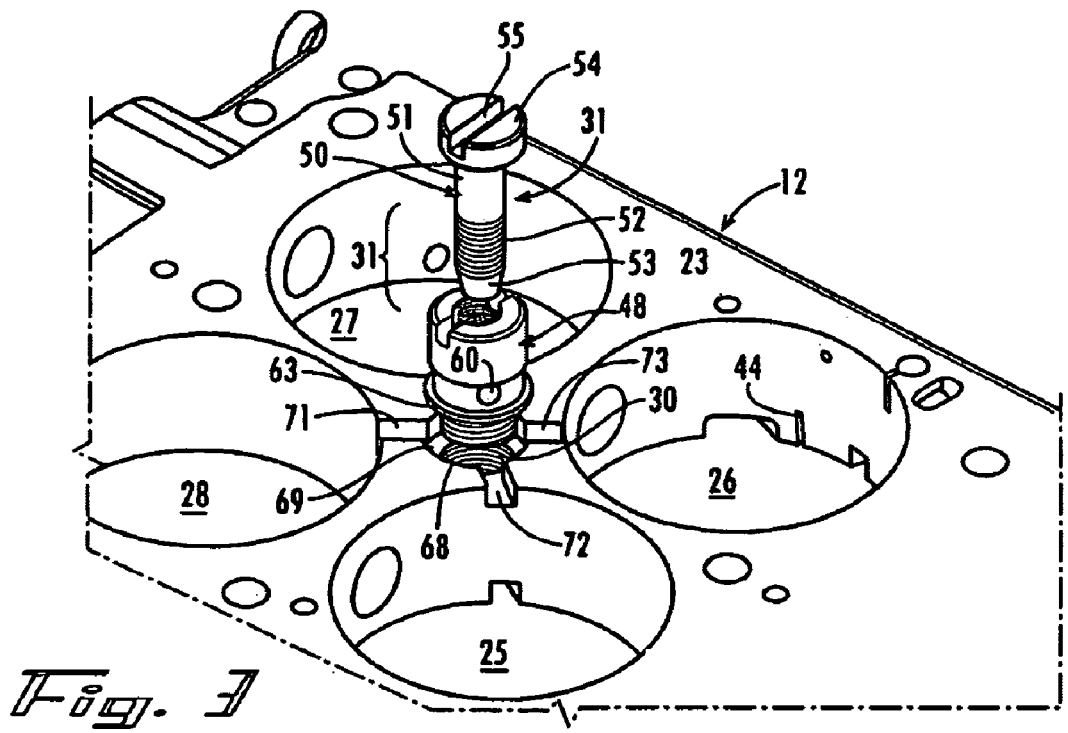
FIG. 3 is a perspective view of the base plate, similar to FIG. 2, but a closer view and the adjustment valve expanded for illustrating how the adjustment valve fits into the air bypass passage of the base plate.
Figure 4:
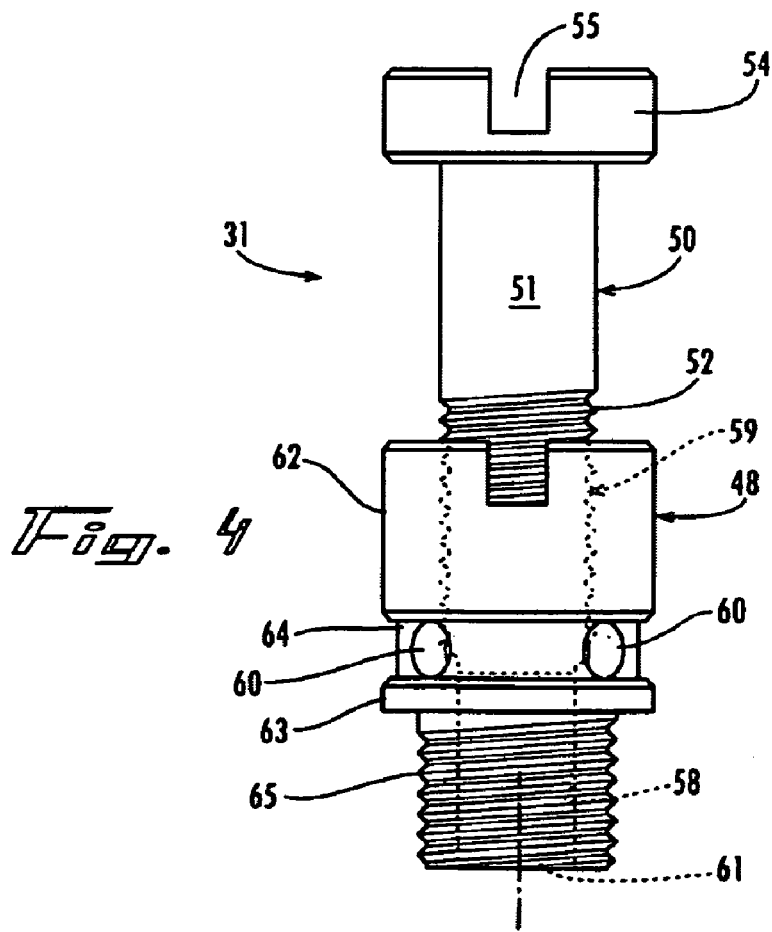
FIG. 4 is a side view of the air adjustment valve.

As best shown in FIGS. 3 and 4, the adjustable air bypass valve 31, sometimes known as a "needle valve," includes a valve body 48 and a valve needle 50. The valve needle includes a shank 51 with a hectically threaded lower end portion 52 terminating in a frustum-conically tapered distal end 53. A cap 54 is formed at the upper, outer end of the shank 51, with a tool receiving shape 55 formed centrally within the upper surface of cap 54.

The valve body 48 is tubular and defines an axial open-ended bore 58 extending therethrough. The upper end of the axial bore is internally threaded at 59, with the threads being sized and shaped to receive the threaded lower end 52 of the valve needle 50. The lower end of the axial bore terminates in the open exit port 61. Radially extending air inlet ports 60 extend through the valve body 48 in communication with the axial bore 58, so that air can be admitted from outside the valve body 48 into the axial bore 58. The distal end 53 of the valve needle is sized and shaped so as to progressively constrict the flow of air from outside the valve body through the air inlet ports 60 as the valve needle is screwed downwardly into the valve body.

The valve body also includes upper and lower annular collars 62 and 63, and an annular slot 64 positioned therebetween, with the annular slot intersecting the radially extending air inlet ports 60. External helical threads 65 are formed about the lower end of the valve body.

As best illustrated in FIG. 3, air bypass passage 30 is open-ended and extends vertically through the base plate 12. Bypass passage 30 includes a substantially cylindrical, hectically threaded internal air passage 68 and an annular counter bore 69 formed in the upper surface 23 of the base plate 12 coaxially with threaded passage 68. Air channels, such as air channels 71, 72 and 73, are formed in the upper surface 23 of the base plate 12, with each air channel intersecting a butterfly bore 25, 26, 27 or 28 at one end and the counter bore 69 at the other end. When the valve body 48 of the air bypass valve 31 is screwed downwardly into the threaded passage 68 of the air bypass passage 30, the lower collar 63 abuts the bottom surface of the counter bore 69, thus limiting the downward movement of the valve body into the air bypass passage 30, with the annular slot 64 of the valve body 48 positioned in direct communication with the counter bore, and in communication with the air channels 71, 72, 73.

Figure 5:
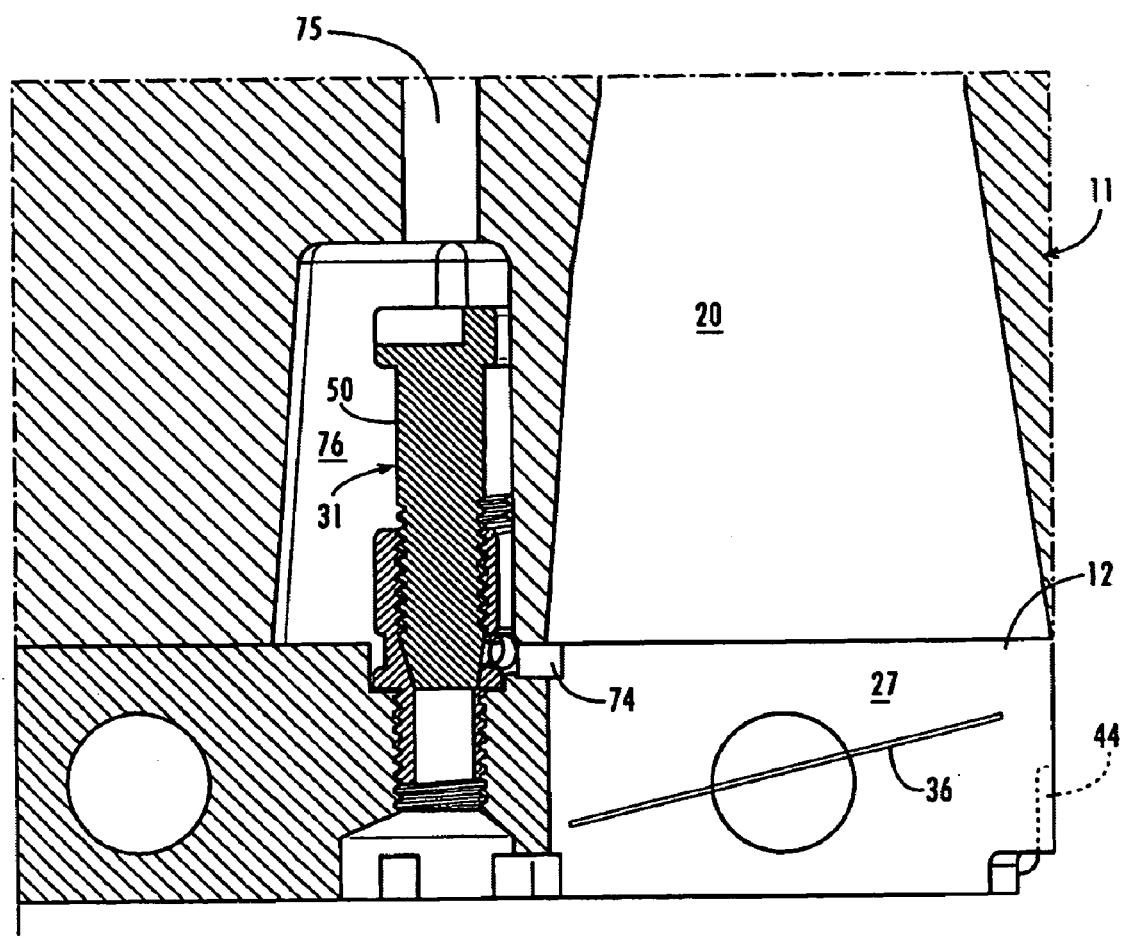
FIG. 5 is a side cross sectional view of the adjustment valve as installed in the carburetor body and base plate.

As illustrated in FIG. 5, the central portion of the carburetor body 11 has a vertically extending opening 75 that is threaded at its upper end for receiving the hold down pin of an air filter. The vertical opening 75 extends further downwardly into the carburetor body, in alignment with the air bypass passage 30 and the adjustable air bypass valve 31. The opening 75 is enlarged at its lower end into an internal chamber 76 that is sized and shaped to surround the upper protruding portions of the adjustable air bypass valve 31. When the carburetor body 11 is mounted on the base plate 12, the venturis, such as venturi 20 in FIG. 5, register with the butterfly bores 25-28 of the base plate, and the air channels, such as air channels 71-74, are at least partially closed along their upper portions by the carburetor body, so that the air channels become open-ended, with one open end of each air channel in communication with the counter bore 69 of the air bypass passage 30, and with the other open end of each air channel in direct communication with the upper portion of one of the butterfly bores 25-28, above the positions of the butterfly valves 35-38. This allows fluid, such as air, to communicate from the four venturis of the carburetor body to the adjustable air bypass valve 31 and the air bypass passage 30 downwardly through the base plate and into the header that leads to the cylinders of the engine.

OPERATION

When the adjustment of air flow is to be made through the carburetor assembly to the engine, the mechanic can remove the hold-down pin and the air filter (not shown) from the vertical threaded opening 75 of the carburetor body and extend a tool, such as a flat blade screw driver, down through the vertical opening 75 until the tool registers with the tool receiving slot 55 of the valve needle 50 of the adjustable air bypass valve 31. The mechanic can rotate the tool which rotates the valve needle 50, so that the hectically threaded lower end 52 of the valve needle moves along the length of the valve body 48 by its engagement with the internal threads 59. When the valve needle 50 is being retracted upwardly out of the valve body, a larger space is provided internally of the radially extending air inlet ports 60, thereby admitting larger volumes of air. When the valve needle 50 is rotated in the opposite direction, the distal end 53 of the valve needle moves progressively downwardly into the axial bore 58 toward the radially extending air inlet ports 60, tending to progressively constrict the air passage through the adjustable air bypass valve 31.

It will be noted that the butterfly valves 35-38 tend to be almost fully closed when the engine of the vehicle is idling. As a result, only a small volume of air at low velocity passes through the venturis and the small velocity of air is not capable of drawing fuel into the air. Therefore, substantially no fuel is supplied to the air from the venturis. In order to increase the amount of air admitted to the engine without increasing the amount fuel to the engine, the adjustable air passage valve 31 can be opened as described above, and the air moving slowly through the venturis then passes through the air channels 71-74 and through the adjustable air bypass valve and through the base plate, without passing through the butterfly valves. This slightly and progressively increases the air to fuel ratio of the fluid reaching the engine without altering the positions of the butterfly valves. This fine tuning as provided by the adjustable air bypass valve 31 allows the mechanic to make slight adjustments to the air/fuel ratio, thereby avoiding the problems described herein before.

It will be noted that the adjustable air bypass valve is mounted to the base plate and is supported by and operates with respect to the base plate, without requiring any co-action with the carburetor body. This tends to make the adjustable air bypass valve very stable in maintaining its position, tending to avoid movements due to vibration, jarring or other physical conditions. Also, the simple two-piece construction of the adjustable air bypass valve 31 is easy to access and adjust, easy to install and replace, and is unlikely to become fouled with debris, since it is downstream of the air filter, and communicates directly with the butterfly bores 25-28 of the base plate. Moreover, the air bypass valve does not have to be sized so as to engage and fit the surfaces of both the carburetor body and the base plate.

Although the carburetor assembly disclosed herein is a four barrel carburetor, the invention can be embodied in a two barrel carburetor assembly. Also, the configuration of the air bypass valve can be varied to fit the space available in the assembly and to have different shapes to provide greater air flow, if desired. The valve needle does not have to be shaped like a needle but shaped to provide the function of constricting the flow of air through the base plate air bypass passage.

Although a preferred embodiment of the invention has been disclosed in detail herein, it will be obvious to those skilled in the art that variations and modifications of the disclosed embodiment can be made without departing from the spirit and scope of the invention as set forth in the following claims.

The invention claimed is:

1. A carburetor assembly for use with an internal combustion engine comprising:
    a base plate defining at least one butterfly opening extending there through for alignment with a venturi passage of a carburetor body, a base plate air bypass passage extending there through, and an air channel extending from the butterfly opening to the air bypass passage,
    a valve body mounted to the base plate and defining an air passage therethrough in air communication with the base plate air bypass passage,
    a valve needle adjustably mounted to the valve body for adjustably constricting the flow of air through the base plate air bypass passage to allow for the adjustment of the volume of air delivered to the engine at idle independently of other components of the assembly.

2. The carburetor assembly of claim 1 and further including a carburetor body with a tool opening aligned with the valve needle for adjusting the valve needle.

3. The carburetor assembly of claim 1, wherein:
    the valve body is tubular shaped with an internal bore extending therethrough, the valve body having external threads at one end and internal threads in the internal bore at the other end and,
    the valve body being mounted by its external threads in the base plate air bypass passage,
    the valve body including at least one air inlet port positioned intermediate the ends of the valve body,
    the valve needle having external threads thereon adjustably received in the internal threads of the valve body for constricting the flow of air through the base plate air bypass passage.

4. A carburetor assembly with an adjustable bypass for air for delivering bypass air to an engine without control of the bypass air by butterfly valves of the carburetor assembly, comprising:
    a carburetor body defining venturi passages there through,
    a base plate defining a plurality of butterfly bores for alignment with the venturi passages of the carburetor body,
    a butterfly valve in each butterfly bore,
    a bypass passage formed in the base plate for directing air to the engine,
    the base plate including air channels extending from the butterfly bores to the bypass passage for passing air from the butterfly bores to the bypass passage,
    a valve body mounted in said base plate bypass passage, said valve body defining an open ended passage,
    an adjustment screw adjustably threaded into the valve body and including a section in registration with the open ended passage of said valve body,
    whereby the adjustment screw can be moved with respect to the valve body to adjust the size of the open ended passage of the valve body to adjust the flow of air through the bypass passage of the base plate.

5. A carburetor assembly for an internal combustion engine, the carburetor assembly including a base plate and a carburetor body mounted on the base plate,
    the base plate including butterfly bores and butterfly valves in the butterfly bores for controlling the flow of fuel and air from the carburetor to the internal combustion engine,
    the base plate including a bypass passage extending therethrough,
    the base plate including air passages extending from the butterfly bores to the bypass passage that allow some of the air flowing through the butterfly bores to bypass the butterfly valves of the base plate and pass through the base plate bypass passage,
    a bypass valve having a valve body mounted on the base plate in air alignment with the base plate bypass passage for movement of air therethrough, and a valve needle adjustably mounted on the valve body for adjustably constricting the flow of air through the base plate bypass passage.

6. A carburetor assembly for an internal combustion engine,
- the carburetor assembly including a base plate and a carburetor body mounted on the base plate,
- the base plate including butterfly bores and butterfly valves in the butterfly bores for controlling the flow of fuel and air from the carburetor to the internal combustion engine,
- the base plate including a bypass passage extending therethrough,
- the base plate including air passages that allow some of the air flowing therethrough to bypass the butterfly valves of the base plate and pass through the base plate bypass passage substantially without the addition of fuel to the bypass air, and for adjusting the flow of the bypass air independently of the function of the butterfly valves of the base plate,
- a bypass valve having a valve body mounted on the base plate in air alignment with the base plate bypass passage for movement of air therethrough, and a valve needle adjustably mounted on the valve body for adjustably constricting the flow of air through the base plate bypass passage,
- wherein the valve body is approximately cylindrical with an internal bore having a tapered section and with one end portion of the valve body externally threaded and the other end internally threaded, and
- the valve body including at least one intermediate air inlet port adjacent the tapered section in fluid communication with the internal bore for admission of air into the internal bore and through the tapered section to the externally threaded end portion, and
- an external annular groove intersecting the intermediate air inlet port.

7. A carburetor assembly including a base plate and a carburetor body mounted on the base plate, the base plate including a plurality of butterfly openings with a butterfly valve in each butterfly opening and the carburetor body including a plurality of venturi passages each aligned with a butterfly opening of the base plate, comprising:
- the base plate including a base plate bypass passage,
- a valve having a valve housing with a valve passage extending there through, and a valve needle,
- the valve housing mounted in the base plate bypass passage and defining at least one valve passage,
- the base plate defining air channels each extending from one of the butterfly openings to the base plate bypass passage and the valve passage of the valve housing such that air flows from the butterfly openings, through the air channels, through the valve passage of the valve housing and through the base plate bypass passage, and
- the valve needle being adjustably mounted to the valve housing for adjustably constricting the flow of air through the valve passage and the base plate bypass opening.

8. The carburetor assembly of claim 7, wherein:
- said valve housing defines an open ended generally cylindrical body with one end portion externally threaded for mounting in the base plate bypass passage and its other end portion internally threaded for adjustably receiving the valve needle, and
- said valve housing including at least one air inlet port intermediate its end portions.

9. The carburetor assembly of claim 7, wherein:
- said carburetor body includes a tool opening aligned with the valve needle such that a tool can be inserted though the tool opening to rotate the valve needle.

10. The carburetor assembly of claim 9, wherein:
the tool opening is internally threaded for receiving an air filter connector rod.

* * * * *